United States Patent [19]

Fisher et al.

[11] Patent Number: 4,613,984
[45] Date of Patent: Sep. 23, 1986

[54] QUICK FILM RELEASE X-RAY CASSETTE MECHANISM

[75] Inventors: Ronald T. Fisher, Middletown; Paul J. Fisher, Newark; David P. Spain, Wilmington, all of Del.

[73] Assignee: E. I. Du Pont de Nemours and Company, Wilmington, Del.

[21] Appl. No.: 668,880

[22] Filed: Nov. 7, 1984

[51] Int. Cl.⁴ ............................................. G03B 17/26
[52] U.S. Cl. ..................................... 378/185; 378/187
[58] Field of Search ....................... 378/182, 185, 187

[56] References Cited

U.S. PATENT DOCUMENTS 4,383,330 5/1983 De Felice et al. ............... 378/187

Primary Examiner—Bruce C. Anderson
Assistant Examiner—T. N. Grigsby

[57] ABSTRACT

An x-ray cassette is modified to facilitate the quick release of x-ray film by securing the entire surface of the resilient supports for the intensifying screen to the cassette's fixed plate. Also an edge of the intensifying screen is bent in the direction of the fixed plate.

12 Claims, 5 Drawing Figures

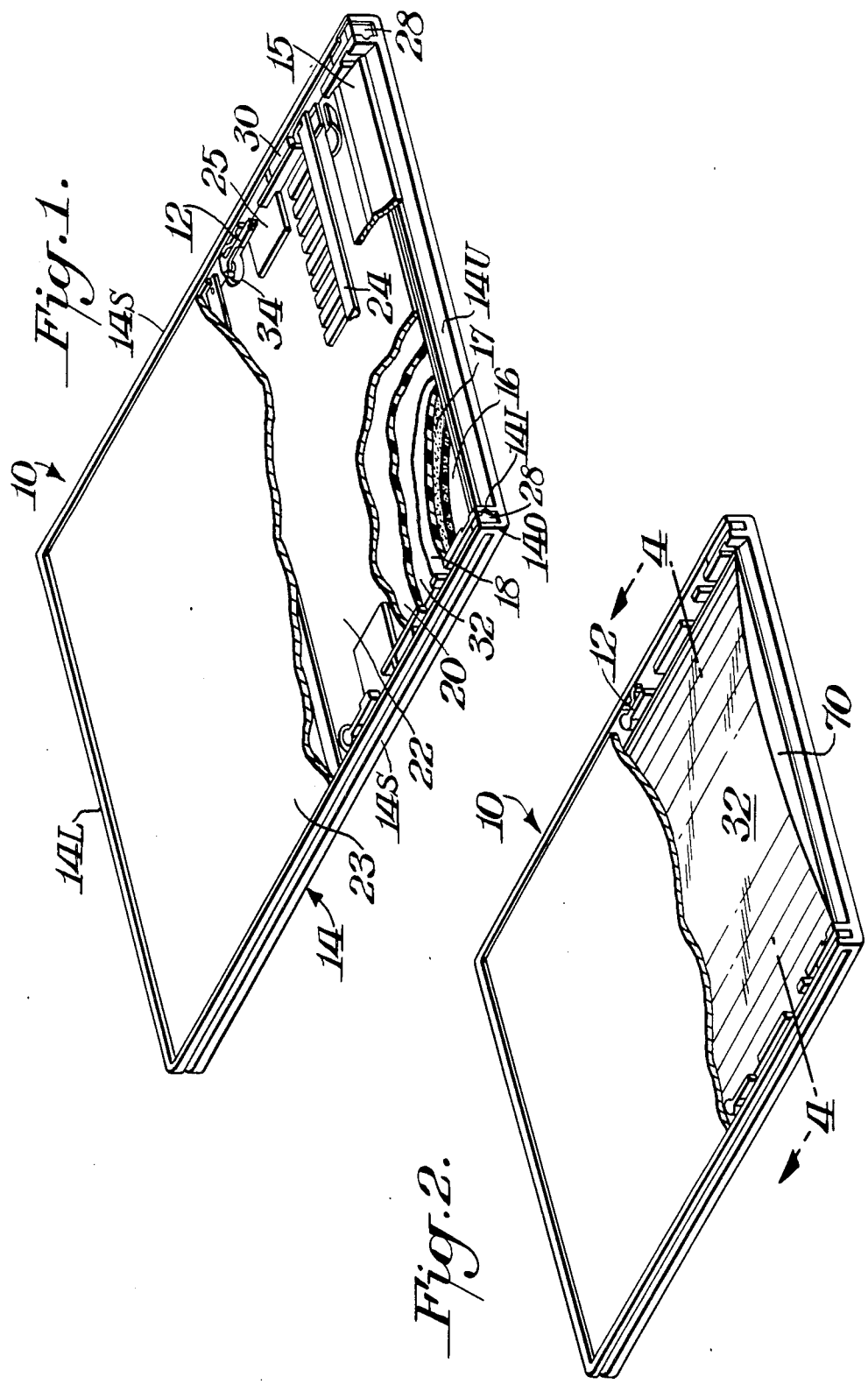

QUICK FILM RELEASE X-RAY CASSETTE MECHANISM

BACKGROUND OF THE INVENTION

This invention relates to an x-ray film cassette and, in particular, to an x-ray cassette having a buckler and intensifying screen arrangement adapted to effect quick release of an x-ray film maintained within the cassette.

In the development of x-ray film handling systems, equipment has been provided which allows the automatic loading and unloading of x-ray film into a cassette under daylight conditions. Such equipment frees the operator from the need to load and unload a film to and from a cassette in a dark room. Exemplary of such an automatic system is that disclosed in U.S. Pat. No. Re. 28,438 (Schmidt) assigned to the assignee of the instant invention. This reissue patent describes an x-ray film package for use with a daylight loading cassette of the type disclosed in U.S. Pat. Nos. 3,784,835 and 3,870,889 (both to Schmidt and both assigned to the assignee of the present invention). U.S. Pat. No. 3,715,087 (Schmidt) describes a device used for unloading cassettes of the last-mentioned patents under daylight conditions.

In its operation, a film sheet is automatically loaded into the cassette which is operative to hold the film between two opposed substantially parallel x-ray intensifying screens during a period of patient exposure. Following exposure, the cassette is unloaded under the influence of gravity using a device, disclosed in the last-mentioned patent, adapted to release one of the two cassette plates supporting the intensifying screens to thereby relieve the holding pressure from the film sheet and allow it to drop under the influence of gravity into a light-tight container.

For a variety of reasons it is important that the time required for the film to drop from the cassette be maintained to within a reasonable maximum of no more than about six seconds. It is believed to be most advantgeous that the film drop time is of the order of three seconds or less. However, it has been found that in cassettes embodying the teachings of the above-referenced patents, the x-ray film often exhibits a tendency to adhere to one of the intensifying screens even after the holding pressure is relieved therefrom. Attempts have been made to overcome this problem through the use of cantilevered actuators (bucklers) disposed along the cassette edges which are actuated by an actuating cam assembly and pivot inwardly of the cassette to edgewise engage the film sheet and buckle the same. This creates a gap between the film sheet and the screen and permits the entry of air into the gap. The entry of air into the gap tends to equalize the pressure forces on both sides of the sheet reducing its tendency to cling to one surface or another and permitting it to respond to the influence of gravity and drop from the cassette. U.S. Pat. No. 4,383,330 discloses a cassette incorporating such bucklers.

Even with the bucklers, however, it has been found that film drop times, while greatly improved, are still sometimes unacceptably long, especially when x-ray film sheet is used with intensifying screens having an extremely smooth surface. Use of such smooth screens is desirable since it results in intimate contact between the film and the screen and consequently in improved image resolution.

Accordingly, it is believed to be advantageous to provide an x-ray cassette having a buckler assembly which will consistently and reliably operate to release the film sheet even when smooth, high resolution screens are used.

SUMMARY OF THE INVENTION

The instant invention relates to an x-ray cassette of the type having fixed and moveable plates adapted to receive a film sheet therebetween, a resilient pad having one side secured to the fixed plate, an x-ray intensifying screen secured to the other side of the pad, and a buckler member positioned in the cassette for engaging an edge of the film sheet to buckle the same, the cassette being adapted to release the film sheet from the cassette in a direction parallel to the buckler engaging edge, characterized in that the resilient pad has substantially the entire surface of the one side secured to the plate and the screen has a portion of an edge contiguous a buckler bent in the direction of the fixed plate thereby to facilitate release of the film sheet when the plates are separated and the buckler is activated. In an alternative embodiment, the bend portion extends the entire length of the edge.

In another alternative embodiment, buckler members are positioned for engaging opposite edges of the film sheet within the cassette and the screen has a portion of each edge contiguous a buckler bent in the direction of the fixed plate. The portions of the screen which are bent may extend the entire length of the respective edges of the screen adjacent the bucklers.

These bent edge portions enhance the ability of the bucklers to introduce air in between the faces of the film sheet and the fixed and moveable plates. This reduces the tendency of the film sheet to cling to one plate or the other and allows the sheet, when released, to quickly slide from the cassette.

BRIEF DESCRIPTION OF THE DRAWINGS

The invention may be more fully understood from the following detailed description thereof taken in connection with accompanying drawings which form a part of this application and in which:

FIG. 1 is a perspective view showing the structure of an x-ray cassette in accordance with the present invention;

FIG. 2 is a perspective view similar to FIG. 1 illustrating a film sheet in a buckled condition;

DETAILED DESCRIPTION OF THE INVENTION

Figure 3:
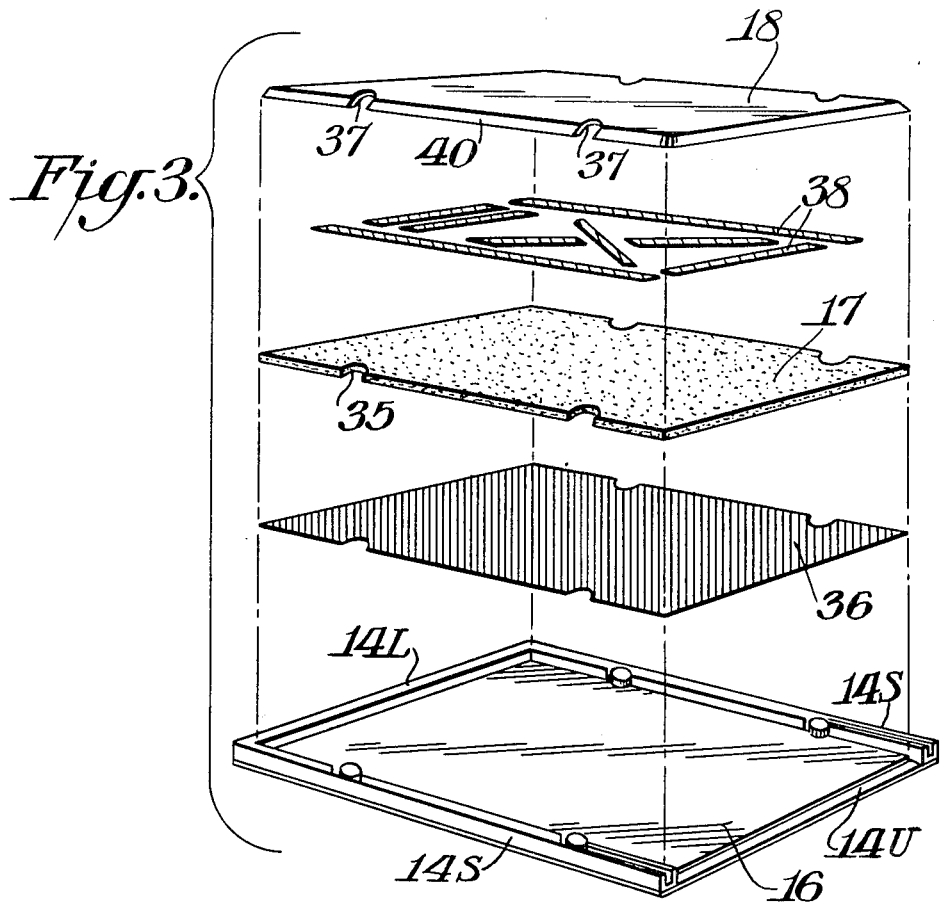
FIG. 3 is an exploded view of the fixed plate portion of the cassette constructed in accordance with the present invention showing the means by which the fixed intensifying screen is mounted.
Figure 4:
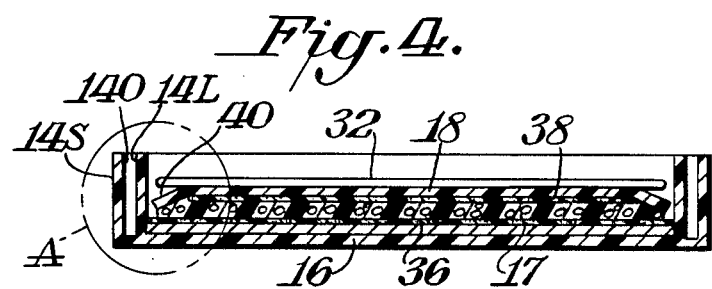
FIG. 4 is a schematic presentation of the cross-section of the cassette taken along line 4—4 of FIG. 2.

Throughout the following detailed description, similar reference numerals refer to similar elements in all figures of the drawings. With reference to FIG. 1 there is shown a perspective view of an x-ray cassette constructed in accordance with the instant invention. The cassette, generally indicated by the reference character 10 employs a buckler assembly 12. The cassette 10 is formed of a rectangular frame 14 formed of opposed sidewalls 14S and upper and lower walls 14U and 14L, respectively. The upper frame wall 14U includes a slot through which a film sheet may be inserted into and retrieved from the cassette. A light gate 15 covers the slot when the cassette is closed. On the frame 14 is mounted an opaque, x-ray transparent front or window plate 16. The plate 16 is fixedly mounted on the rectangular frame 14. The window plate 16 typically is fabricated of magnesium sheet, although any suitable material meeting the above criteria such as aluminum, carbon fiber reinforced resin or other synthetic materials may be employed. Disposed above the window plate 16 is a foam pad 17 and an x-ray intensifying screen 18. A second x-ray intensifying screen 20 is mounted to a backing plate 22 which is moveably disposed within the frame 14. A rear plate 23 also mounted on the frame 14 completes the cassette 10. The plates 22 and 23 may be fabricated of aluminum or any other suitable material.

The sidewalls 14S of the frame 14 define a channel cross-section having an inner and outer rail 14I and 14O, respectively. An appropriate number of biasing elements 24 are pivotably mounted on the inner rail 14I of the channel sidewalls 14S and extend traversely across the width of the frame 14. The biasing elements act as support for the moveable backing plate 22 and bias it toward the window plate 16. Reinforcing tabs 25 may be provided in larger size cassettes to reinforce the backing plate 22. A spring biased cam rail assembly 28 is slidably received within each of the channels. Cam surfaces 30 on the cam rail 28 engage and actuate the biasing elements 24 to alternately release or urge the moveable backing plate 22 against the window plate 16.

With cam rail 28 in the first position, the biasing force imposed by the biasing elements 24 on the back plate is released defining a space between the backing and the window plates sufficient to allow an x-ray film sheet 32 to be received between the two intensifying screens 18, 20. With the cam rail 28 in the second position the biasing elements 24 urge backing plate 22 toward the window plate 16 to provide intimate contact between the two intensifying screens 18 and 20 with the film sheet 32 sandwiched therebetween. The intensifying screens 18 and 20 and the backing 22 are provided with notches or cut-outs 34 at predetermined locations thereon to allow buckler 12 intrusions into the film area.

In order to release the film 32 following exposure thereof the cam rail 28 is displaced to the first releasing position to relieve the biasing force from the back plate 16 and thereby permit the film sheet 32 to fall, under the influence of gravity, in a direction parallel to the buckler engaging edges, to a suitable receptable. To facilitate the quick release of the film from within the cassette, at least one but preferably four buckler assemblies 12 are provided at predetermined locations along the channel of the sidewalls 14S of the frame 14.

With reference to FIG. 3 there is shown in greater detail an intensifying screen 18 constructed in accordance with the present invention to facilitate the quick release of a film sheet. A layer of adhesive 36, such as provided by a double sided tape sized to cover the full surface of the window plate 16, is first applied thereon. Contrary to the prior art cassettes in which only portions of the pad 17 are secured to the window plate 16, one face of the foam pad 17 is applied over the layer of adhesive 36. As a result, the entire face of one side of the foam pad is secured on window plate 16. The foam pad 17 includes notches 35 to allow intrusion of the bucklers into the film area. Strips of two-sided adhesive tape 38, generally forming a rectangle, are placed along the edges and portions of the interior of the opposite or second face of the foam pad 17. In the interior portions tape is placed over the second face in the shape of an X. An x-ray intensifying screen 18 is then positioned over the pad surface to be held thereon by the adhesive strips 38.

Figure 5:
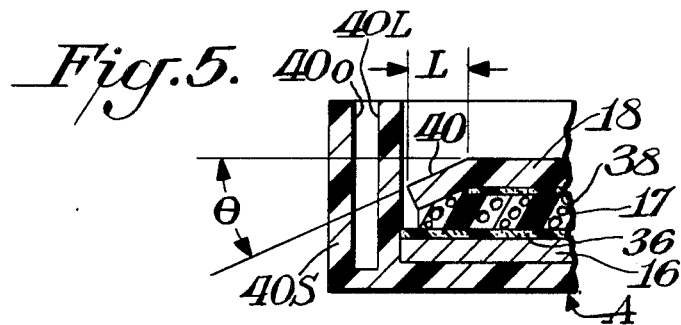
FIG. 5 shows an enlarged portion of FIG. 4 depicting the bent portion of a screen mounted within said cassette.

A portion 40 of the screen 18 is bent along its edges contiguous the bucklers 12 in a direction away from a film sheet 32 and toward the window plate 16. The portion of the screen bent towards window plate 16 preferably extends the full length of the sides of the screen adjacent one or both channels 14S. An angle theta ($\theta$), as best seen in FIG. 5, which defines the acute angle between the planes of the screen 18 and the bent edges 40, varies between 15 degrees and 40 degrees, the preferred range being between 20 degrees and 30 degrees. The bent portion 40 of the screen 18 may compress the foam pad 17, or the edge of the pad may be tapered or otherwise shaped to fit under the screen. In determining the width of the bent portion of the screen, as measured from the outside edge toward the inner portion of the screen (length "L" in FIG. 5) the maximum combination of angle and length is such that the underside edge of the screen 18 contacts the surface of plate 16. In practical terms this is about 1/16 to $\frac{1}{8}$ of an inch for an x-ray cassette capable of handling 14×17 inch film sheets. The typical foam pad thickness is about 0.1 inches, in which case an angle of about 24 degrees results in droptimes of under 2 seconds.

The bent portion 40 of screen 18 may extend only partially along the edge adjacent a channel 14S; so long as one buckler is operating in a cut-out along the bent portion, quick release of the film is obtained. The bent portion may also extend along two, three or even four sides of the screen as shown in FIG. 3. However bending only along the edge contiguous the bucklers is generally preferred for simplicity.

The effect of the bent edge of the screen along with the use of a full layer of adhesive under the foam backing 17 and the operation of the bucklers is not completely understood. It is believed that when the back plate 22 under the action of biasing elements 24 presses film sheet 32 against the intensifying screen 18, air is excluded from between the contacting surfaces of the intensifying screen 18 and the film sheet 32. In the cassettes of the prior art, during the unloading operation, as the cam rail 28 responds to an actuating force in a direction towards back frame 14L, cam surfaces 30 on the cam rail 28 engage the biasing element 24 to relieve the biasing force imposed on the backing plate 22. Simultaneously buckler 12 as shown in FIG. 2 operates to buckle and hence force portions of film sheet 32 away from intensifying screen 18. However, because of the smoothness of the surface of the screen 18 and of the film sheet 32, air flows slowly between the film sheet and the screen, and the film cannot drop immediately from the cassette. Even as the bucklers try to force the film sheet away from the screens, a suction cup effect pulls the film sheet and screens together.

The present structure, by providing a foam pad rigidly mounted on window plate 16 over its full surface does not allow the intensifying screen to move with the film, but holds the screen firmly in position against back plate 16. At the same time, the bent portion of the screen along its edges adjacent to the bucklers provides an easy path for air to enter between the screen and the film sheet, especially at the point where the bucklers force the film away from the screen. The film is thus quickly released from contact with the screen.

Once the film has been released from the cassette, the actuating force on the cam rail 28 is removed and a biased spring (not shown) disposed in the channel sidewalls 14S of the frame 14 returns the cam rail 28 to its original position, thus completing the unloading cycle.

Those skilled in the art having the benefits of the teachings of the instant invention, as hereinabove set forth may effect numerous modifications thereto. Thus, while the screen is shown forming a sharp edge at the bending point along its bent portion, the bent portion may also form a gradual curve. While the edge of the foam is shown as being coextensive with the edge of the screen, it is understood that the foam may extend only partially under the bend portion 40 of the screen 18. Similarly the use of a thick screen may be contemplated wherein rather than a bent edge surface, the edge of the screen may be believed to facilitate the entry of air away from the plane of the film sheet placed thereon. These and other modifications are to be construed as lying within the contemplation of the instant invention as defined in the appended claims.

What is claimed is:

1. An x-ray cassette of the type having fixed and moveable plates adapted to receive a film sheet therebetween, a resilient pad having one side secured to the fixed plate, an x-ray intensifying screen secured to the other side of the pad, and a buckler member positioned in the cassette for engaging an edge of the film sheet to buckle the same, the cassette being adapted to release the film sheet from the cassette in a direction parallel to the buckler engaging edge, characterized in that the resilient pad has substantially the entire surface of the one side secured to the plate, and the screen has a portion of an edge contiguous a buckler bent in the direction of the fixed plate, thereby to facilitate release of the film sheet when the plates are separated and the bucklers are activated.

2. An apparatus as set forth in claim 1 wherein the bent portion extends the entire length of the edge.

3. An apparatus as set forth in claim 2 wherein buckler members are positioned for engaging opposite edges of the film sheet and the screen has a portion of each edge contiguous a buckler bent in the direction of the fixed plate.

4. An apparatus as set forth in claim 3 wherein the bent portions extend the entire lengths of the respective edges.

5. A cassette as set forth in claim 1 wherein the angle between the plane of the screen and the bent edge lies in the range of 15° to 40°.

6. A cassette as set forth in claim 2 wherein the angle between the plane of the screen and the bent edge lies in the range of 15° to 40°.

7. A cassette as set forth in claim 3 wherein the angle between the plane of the screen and the bent edge lies in the range of 15° to 40°.

8. A cassette as set forth in claim 4 wherein the angle between the plane of the screen and the bent edge lies in the range of 15° to 40°.

9. A cassette as set forth in claim 1 wherein the angle between the plane of the screen and the bent edge lies in the range of 20° to 30°.

10. A cassette as set forth in claim 2 wherein the angle between the plane of the screen and the bent edge lies in the range of 20° to 30°.

11. A cassette as set forth in claim 3 wherein the angle between the plane of the screen and the bent edge lies in the range of 20° to 30°.

12. A cassette as set forth in claim 4 wherein the angle between the plane of the screen and the bent edge lies in the range of 20° to 30°.

* * * * *